United States Patent Office 3,206,478
Patented Sept. 14, 1965

3,206,478
AMINOARYLALKANONE (ARYLGUANYL-
HYDRAZONES)
Adrian Marxer, Muttenz, and Atso Ilvespaa, Neu-Allschwil, Switzerland, assignors to Ciba Corporation, New York, N.Y., a corporation of Delaware
No Drawing. Filed Oct. 2, 1962, Ser. No. 227,711
Claims priority, application Switzerland, Oct. 5, 1961, 11,578/61
8 Claims. (Cl. 260—343.7)

The present invention relates to new hydrazones. More especially it concerns guanylhydrazones of the formula

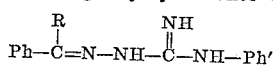

where R represents an alkyl radical, Ph a phenyl radical containing an amino group and Ph' a phenyl radical and the salts of said compounds.

The alkyl radical R is more especially a lower alkyl, for example a methyl, ethyl, propyl or isopropyl group, or a straight or branched butyl, pentyl or hexyl group bound in any desired position.

The amino group in the phenyl radical Ph is a free amino group or a mono- or disubstituted amino group. Particularly suitable substituents for this amino group are, for example, alkyls, for example those mentioned above, or acyl radicals such, for example, as lower alkanoyl groups such as acetyl, propionyl, butyryl, valeryl, or benzoyl groups which may contain further substituents, for example those mentioned below for the phenyl radicals.

The phenyl radicals Ph and Ph' may contain further substituents, for example alkyls such as those mentioned above, alkoxy such as lower alkoxy groups, for example methoxy, ethoxy, propoxy or butoxy, or halogen such as fluorine, chlorine or bromine or the pseudohalogen trifluoromethyl.

The radical Ph' contains advantageously at least one halogen atom or a trifluoromethyl group, more especially in para-position.

The new hydrazones exert an anti-allergic and anti-inflammatory action on rats. They can therefore be used as medicaments for the treatment of inflammatory and allergic conditions. Furthermore, they are valuable intermediates for the manufacture of medicaments.

Of special value are the compounds of the formula

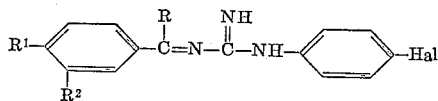

where R represents lower alkyl, more especially methyl, one of the substituents $R^1$ and $R^2$ represents a free or mono- or disubstituted amino group, more especially a free amino group or a mono- or di-(lower alkyl)-amino group and the other represents hydrogen, and Hal stands for a halogen atom, more especially for chlorine, or for trifluoromethyl, and their salts.

The new compounds are obtained by known methods; advantageously a compound of the formula

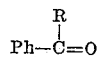

where Ph represents a phenyl radical containing an amino group and R an alkyl radical is reacted with a 1-Ph'-3-aminoguanidine of the formula

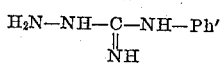

where Ph' has the above meaning, advantageously used in the form of a salt thereof with an acid.

The above-mentioned reaction is performed in the usual manner, in the presence or absence of a diluent, condensing agent, or catalyst, at room temperature or below or above it, if desired under superatmospheric pressure.

The starting materials are known or can be prepared by known methods.

As starting materials in the present process there may also be used derivatives which are transformed into the aforementioned starting materials under the reaction conditions.

Depending on the reaction conditions used the new compounds are obtained as free bases or in the form of their salts. Especially useful salts are those of therapeutically acceptable acids such as inorganic acids, for example hydrohalic acids such as hydrochloric or hydrobromic acid, perchloric, nitric or thiocyanic acid, sulfuric or phosphoric acids; or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicyclic, 4-aminosalicylic, 2-phenoxybenzoic, 2-acetoxybenzoic, methanesulfonic, ethanesulfonic, hydroxy-ethanesulfonic, benzenesulfonic, para-toluenesulfonic, naphthalenesulfonic acid or sulfamylic acids.

A resulting salt can be converted in conventional manner into its free base or a free base into a salt thereof, for example one of those mentioned above.

The salts of the new compounds can also serve for the purification of the resulting bases, in that the bases are converted into the salts, the latter separated, and the bases liberated therefrom.

The invention further includes any variant of the present process in which an intermediate obtainable at any stage of the process is used as starting material and any remaining steps are carried out, or the process is discontinued at any stage thereof, or in which a starting material is formed under the reaction conditions.

The new compounds can be used as medicaments, for example in the form of pharmaceutical preparations containing said compounds or their salts in admixture or conjunction with an organic or inorganic, solid or liquid pharmaceutical excipient suitable for enteral, parenteral or local administration. Suitable excipients are substances that do not react with the new compounds such, for example, as water, gelatine, lactose, starch, magnesium stearate, talc, vegetable oils, benzyl alcohols, gums, polyalkylene glycols, white petroleum jelly, chlolesterol or other known medicinal excipients. The pharmaceutical preparations may be, for example, tablets, dragees, ointments or creams, or in liquid form solutions, suspensions or emulsions. They may be sterilised and/or contain assistants such as preserving, stabilising, wetting or emulsifying agents, salts for regulating the osmotic pressure or buffers. They may further contain other therapeutically valuable substances. The preparations are formulated by conventional methods.

The following examples, illustrate the invention.

*Example 1*

11.38 grams of 1-para-chlorophenyl-3-aminoguanidine hydrochloride are dissolved with heating in 30 cc. of alcohol and 5 cc. of water. 6.76 grams of meta-aminoacetophenone with 50 cc. of alcohol are added to the solution and the mixture is heated for 5 hours on a boiling water bath, and then filtered; the alcoholic solution is evaporated to dryness under vacuum, the resulting foam is dissolved in 20 cc. of alcohol, and 25 cc. of acetone are added. A small amount of precipitating crystals (melting unsharply at 177 to about 205° C.) is filtered off and the mother liquor is once more evaporated under vacuum.

When 50 cc. of acetone are added to the residue it undergoes gradual crystallisation.

The resulting meta-aminoacetophenone-para-chlorophenyl-guanylhydrazone hydrochloride of the formula

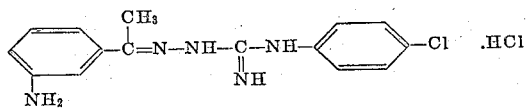

is isolated and washed with acetone; it melts at 238 to 241° C.

*Example 2*

A mixture of 8.16 grams of meta-dimethylamino-acetophenone, 11.20 grams of 1-para-chlorophenyl-3-aminoguanidine hydrochloride and 50 cc. of pyridine is refluxed for 5 hours in an oil bath at 130° C. The mixture is then filtered, the filtrate evaporated to dryness under vacuum and the residue is mixed with 50 cc. of alcohol. The gradually separating crystallisate is isolated, washed with alcohol and dried, to yield, meta-dimethylaminoacetophenone-para-chlorophenyl-guanylhydrazone hydrochloride of the formula

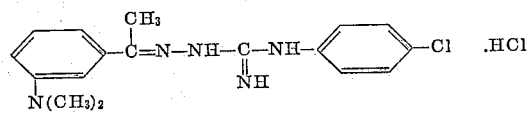

melting at 206 to 208° C.

*Example 3*

A mixture of 6.76 grams of para-aminoacetophenone and 11.20 grams of 1-para-chlorophenyl-3-aminoguanidine hydrochloride is covered with 50 cc. of pyridine and refluxed for 5 hours in an oil bath of 130° C. The solution is filtered, the mother liquor evaporated under vacuum, and 50 cc. of alcohol is added to the residue. At first the batch dissolves but a short time afterwards the resulting para-aminoacetophenone-para-chlorophenyl-guanyldrazone hydrochloride of the formula

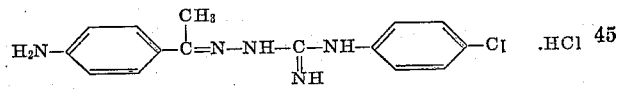

separates out in crystalline form. It melts at 115 to 120° C. with evolution of gas.

What is claimed is:
1. A member selected from the group consisting of a guanylhydrazone of the formula

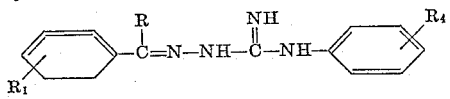

in which R stands for lower alkyl, $R_1$ represents a member selected from the group consisting of amino, mono-lower alkylamino and di-lower alkylamino and $R_4$ stands for a member selected from the group consisting of hydrogen, halogen and trifluoromethyl, and an acid addition salt thereof.

2. A guanylhydrazone of the formula

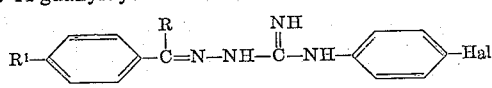

in which R represents lower alkyl and $R^1$ represents amino and Hal stands for halogen.

3. A guanylhydrazone of the formula

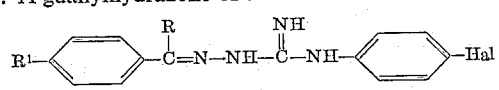

in which R represents lower alkyl and $R^1$ represents di-lower alkylamino and Hal stands for halogen.

4. A guanylhydrazone of the formula

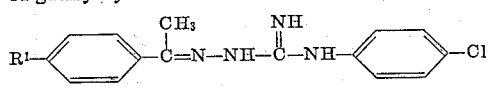

in which $R^1$ represents amino.

5. Meta-aminoacetophenone-(para-chlorophenyl-guanylhydrazone).

6. An acid addition salt of a compound claimed in claim 5.

7. Meta-dimethylaminoacetophenone-(para-chlorophenyl-guanylhydrazone).

8. An acid addition salt of a compound claimed in claim 7.

References Cited by the Examiner

UNITED STATES PATENTS
2,952,677  9/60  Birtwell _____ 260—565

FOREIGN PATENTS
842,324  7/60  Great Britain.

CHARLES B. PARKER, *Primary Examiner.*

UNITED STATES PATENT OFFICE
CERTIFICATE OF CORRECTION

Patent No. 3,206,478    September 14, 1965

Adrian Marxer et al.

It is hereby certified that error appears in the above numbered patent requiring correction and that the said Letters Patent should read as corrected below.

Column 4, lines 4 to 6, the formula should appear as shown below instead of as in the patent:

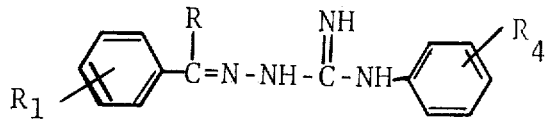

Signed and sealed this 13th day of December 1966.

(SEAL)
Attest:

ERNEST W. SWIDER
Attesting Officer

EDWARD J. BRENNER
Commissioner of Patents